(12) United States Patent
Egan

(10) Patent No.: US 6,222,561 B1
(45) Date of Patent: Apr. 24, 2001

(54) RENDER OPTIMIZATION USING PAGE ALIGNMENT TECHNIQUES

(75) Inventor: Kenneth William Egan, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/156,131

(22) Filed: Sep. 17, 1998

(51) Int. Cl.$^7$ .............................. G06F 15/00; G06T 21/00
(52) U.S. Cl. ............................................ 345/501; 345/509
(58) Field of Search ...................................... 345/501–503, 345/507–510

(56) References Cited

U.S. PATENT DOCUMENTS

| | | | |
|---|---|---|---|
| 5,056,044 | 10/1991 | Frederickson et al. | 364/521 |
| 5,371,514 | * 12/1994 | Lawless et al. | 345/145 |
| 5,548,709 | 8/1996 | Hannah et al. | 395/164 |
| 5,602,984 | 2/1997 | Mieras | 395/501 |
| 5,706,481 | 1/1998 | Hannah et al. | 395/519 |
| 6,088,018 | * 7/2000 | DeLeeuw et al. | 345/156 |

* cited by examiner

*Primary Examiner*—Kee M. Tung
(74) *Attorney, Agent, or Firm*—Leslie A. VanLeeuwen; Felsman, Bradley, Vaden, Gunter & Dillon, LLP

(57) ABSTRACT

To reduce the performance penalty associated with frame buffer memory access times for each page when rendering a primitive having scan lines which cross page boundaries, rendering is constrained to a single page at a time. All pixels mapping to a currently-cached frame buffer page are rendered before loading a different frame buffer page into the cache in order to render other pixels within the primitive. Any pixels within a scan region which map to a different page than the active page are temporarily skipped until all pixels mapping to the current page are completed. Only when no more pixels require rendering within the primitive which map to the currently active frame buffer page is another frame buffer page loaded and all pixels mapping to that page are rendered. In processing a scan region which crosses a page boundary, the next pixel or pixel group to be rendered is examined to determine if it maps to the currently active frame buffer page. If so, it is rendered; if not, however, the position is latched, together with any other necessary state information, and rendering proceeds with the next scan region. Once all pixels for a currently active page are rendered, the latched position is loaded, together with the frame buffer page necessary to render the corresponding pixels, and rendering of the primitive proceeds until complete.

22 Claims, 5 Drawing Sheets

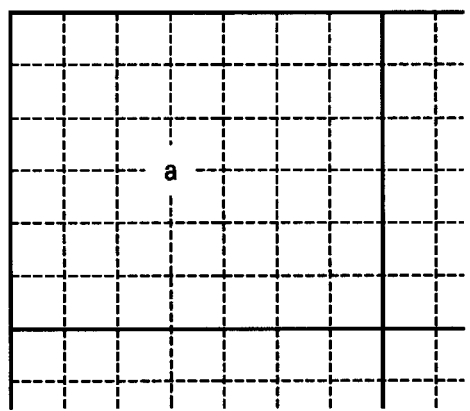
*Fig. 5A*
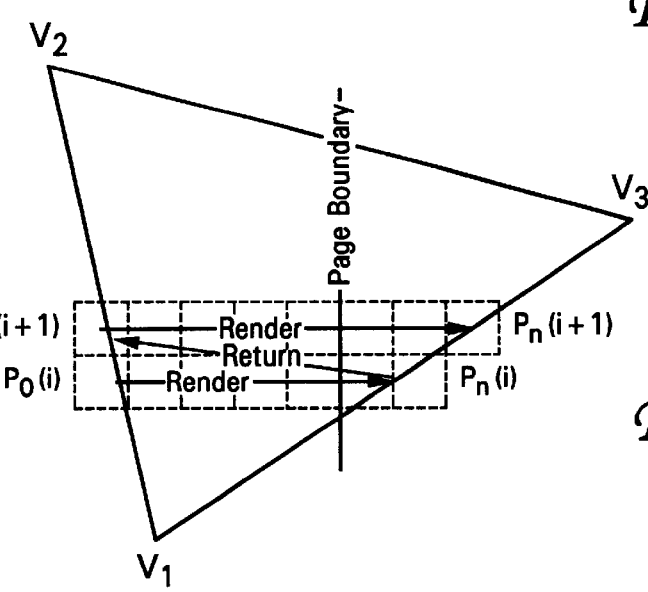
*Fig. 5B*
*Fig. 5C*
*Prior Art*

RENDER OPTIMIZATION USING PAGE ALIGNMENT TECHNIQUES

BACKGROUND OF THE INVENTION

1. Technical Field

The present invention relates in general to rendering in data processing system displays and in particular to rendering primitives processed as multiple, parallel horizontal or vertical scan lines. Still more particularly, the present invention relates to optimizing frame buffer utilization during rendering by minimizing page boundary crossings.

2. Description of the Related Art

Rendering within data processing systems is the process of generating two dimensional images of data for display on a monitor. Typically, rendering includes processing geometric primitives (e.g., points, lines and polygons) to determine component pixel values for the monitor display, a process often referred to specifically as rasterization.

The pixels for the display area of a data processing system monitor are conventionally viewed as a matrix. The pixel matrix and/or the frame buffer, which stores rendered pixel information from which the display is refreshed, are typically partitioned for manageability. Pixel information may be partitioned in a contiguous fashion as illustrated in FIG. 5A, with all data within a frame buffer or frame buffer partition corresponding to a contiguous region of adjacent pixels, or in an interleaved fashion as illustrated in FIG. 5B, with each frame buffer containing every nth pixel of every mth line in the matrix. A 4×1 interleaved partitioning of display pixels to frame buffers is depicted in FIG. 5B.

Rendering primitives to generate frame buffer data typically involves dividing the primitive into scan lines, single-pixel thick horizontal or vertical regions of the primitive. Scan lines are also referred to as spans, a term used interchangeably to refer to a scan line or the series of adjacent pixels which make up a scan line. FIG. 5C depicts two horizontal scan lines defined by endpoint pixels $P_0(i)$–$P_n(i)$ and $P_0(i+1)$–$P_n(i+1)$ within a primitive defined by vertices $V_1$, $V_2$, and $V_3$. Although the primitive in the example shown in FIG. 5C is divided into horizontal scan lines, vertical scan lines may be utilized with no greater complexity, and frequently are employed.

When rendering, conventionally a scan line is started from an initial point $P_0(i)$ and rendered along the scan line until the end of the span is reached at $P_n(i)$. The next scan line is then begun at an initial point $P_0(i+1)$ at the same end as the point at which the previous scan line was started, and the next scan line is rendered in the same direction as the previous scan line. Scan lines may be rendered a single pixel at a time, or multiple adjacent pixels may be rendered concurrently so that the scan line is rendered in unit of m pixels. Additionally, multiple scan lines may be rendered in parallel, so that m pixels of n scan lines are processed concurrently, then the next m pixels of the same n scan lines are rendered, and so forth until the end of the scan line is reached, when the next n adjacent scan lines are started. Thus, the primitive is effectively rendered in as many blocks of n×m pixels as is required.

One problem in rendering primitives as described above is that the fill rate for the primitive is directly associated with frame buffer utilization. Each frame buffer or frame buffer partition may contain multiple memory pages. If the pixel information for pixels within a scan line bridges a page boundary within the frame buffer or frame buffer partition, rendering a primitive may require multiple frame buffer page-ins and page-outs per scan line. Each time a page boundary is crossed and frame buffer pages must be paged-in or paged-out of the cache, a substantial performance penalty is incurred. The greater the number of memory page crossings, the lower the performance of the rendering system and the lower the primitive fill rate.

Cache techniques may improve rendering performance by delay frame buffer memory accesses. However, the cache itself is typically mapped directly to the frame buffer(s) in a tiled fashion (that is, where each cache segment containing pixel information for multiple pixel segments, where scan lines are rendered a pixel segment at a time), and is not dynamically resizable for rendering individual primitives.

It would be desirable, therefore, to provide a mechanism for rendering primitives which minimized page crossing during rendering of primitive scan lines.

SUMMARY OF THE INVENTION

It is therefore one object of the present invention to provide an improved method and apparatus for rendering in data processing system displays.

It is another object of the present invention to provide an improved method and apparatus for rendering primitives processed in data processing systems as multiple, parallel horizontal or vertical scan lines.

It is yet another object of the present invention to provide a method and apparatus for optimizing frame buffer utilization during rendering by minimizing page boundary crossings.

The foregoing objects are achieved as is now described. To reduce the performance penalty associated with frame buffer memory access times for each page when rendering a primitive having scan lines which cross page boundaries, rendering is constrained to a single page at a time. All pixels mapping to a currently-cached frame buffer page are rendered before loading a different frame buffer page into the cache in order to render other pixels within the primitive. Any pixels within a scan region which map to a different page than the active page are temporarily skipped until all pixels mapping to the current page are completed. only when no more pixels require rendering within the primitive which map to the currently active frame buffer page is another frame buffer page loaded and all pixels mapping to that page are rendered. In processing a scan region which crosses a page boundary, the next pixel or pixel group to be rendered is examined to determine if it maps to the currently active frame buffer page. If so, it is rendered; if not, however, the position is latched, together with any other necessary state information, and rendering proceeds with the next scan region. Once all pixels for a currently active page are rendered, the latched position is loaded, together with the frame buffer page necessary to render the corresponding pixels, and rendering of the primitive proceeds until complete. The reduction in page change performance penalty more than offsets any increase in rendering complexity required to completely render one side of a page boundary before beginning the other side.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 5A–5B are diagrams of frame buffer partitioning which may be employed with the prior art or with the present invention; and FIG. 5C depicts a method of rendering a primitive in accordance with the prior art.

DETAILED DESCRIPTION OF THE PREFERRED EMBODIMENT

Figure 1:
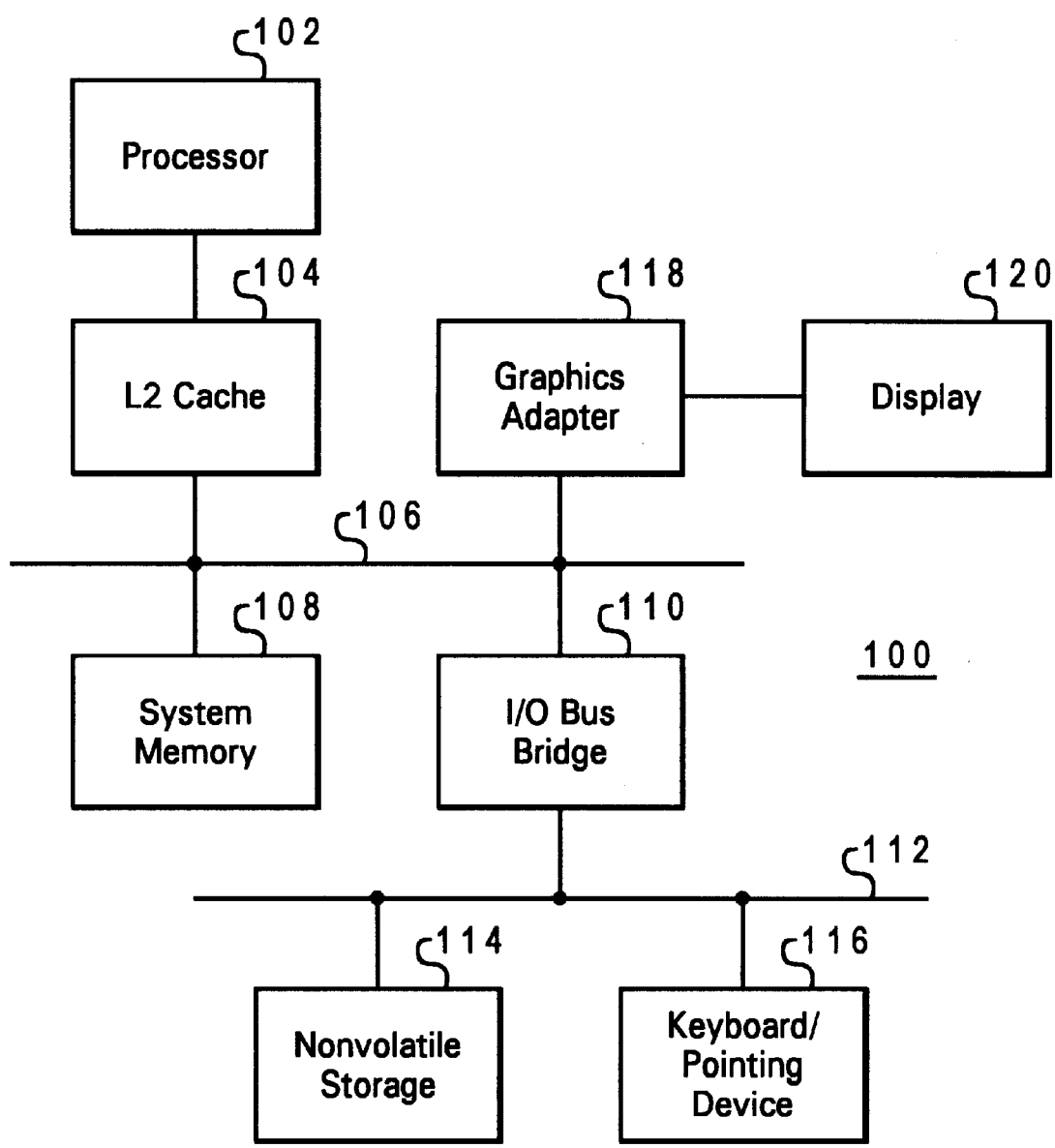
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 includes a processor 102, which is preferably a PowerPC™ processor available from International Business Machines Corporation of Armonk, N.Y. Processor 102 in the exemplary embodiment is connected to a level two (L2) cache 104, which is connected in turn to a system bus 106.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or a digitizer pad, are connected to I/O bus 112.

In a preferred embodiment, data processing system 100 includes graphics adapter 118 connected to system bus 106, receiving primitives for rendering from processor 102 and generating pixels for display 120 as described in further detail below. However, those skilled in the art will recognize that a graphics adapter is not necessary and rendering in accordance with the present invention may be performed within the remainder of data processing system 100 utilizing processor 102 for computations and a portion of system memory 108 for the frame buffer. However, the present invention is preferably implemented in a data processing system including a graphics adapter.

Figure 2:
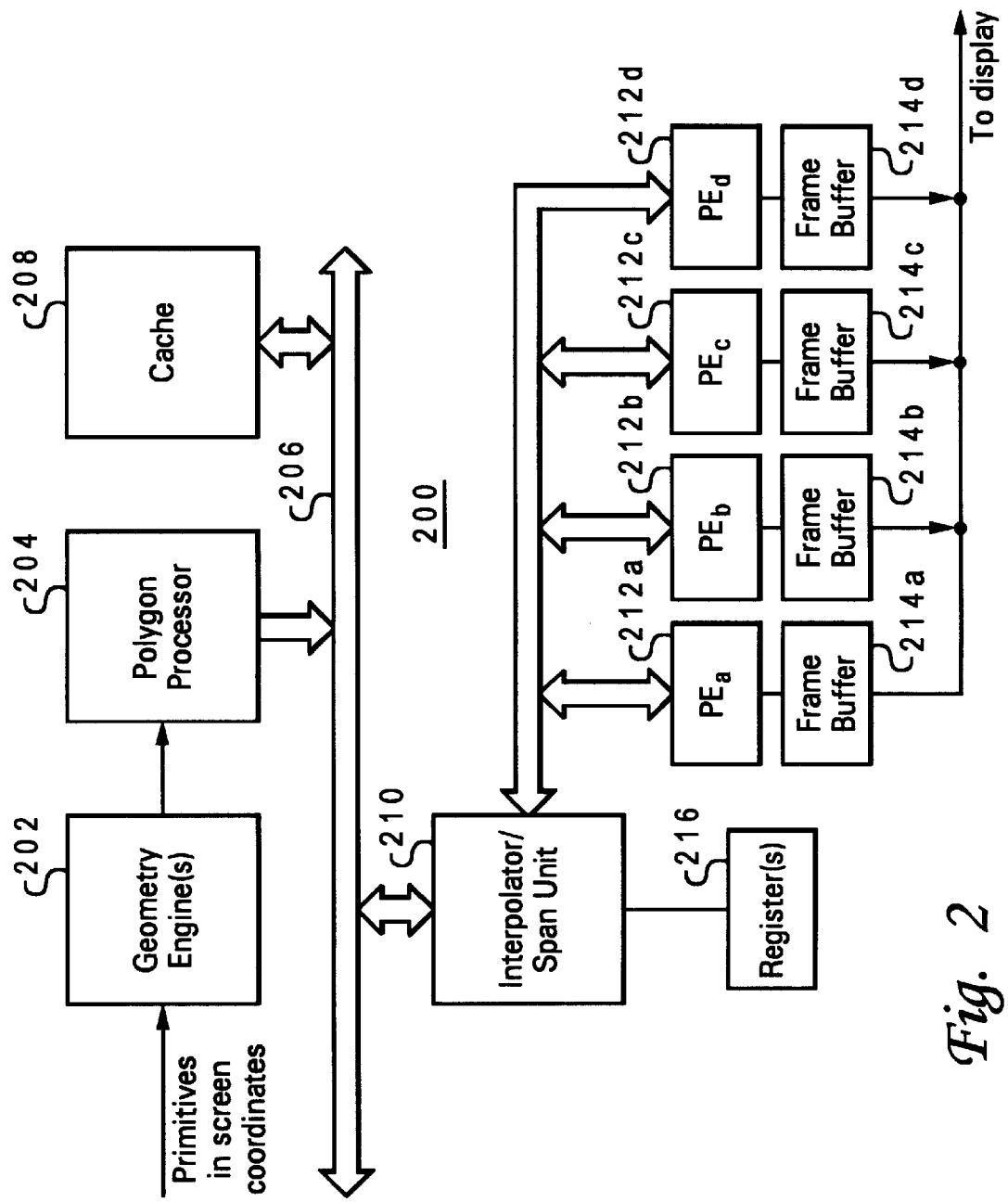
FIG. 2 is a diagram for a back end configuration within a graphics adapter which may implement a preferred embodiment of the present invention.

Referring to FIG. 2, a diagram for a back end configuration within a graphics adapter which may implement a preferred embodiment of the present invention is illustrated. Back end 200 receives primitives in screen coordinates and processes them with one or more geometry engine(s) 202, which perform geometric transformation, lighting computations, clipping, perspective division, and conversion of the resulting primitive coordinates to integers. The output of geometry engine(s) 202 is received by polygon processor 204, which sorts the polygon vertices for edge and span processing.

The polygon vertices are broadcast by polygon processor 204 on a bus 206 accessible to cache 208 and to interpolator/span unit 210. Interpolator/span unit 210 employs the vertices to calculate slopes for the lines bounding the polygon, to determine the coordinates of each pixel lying on a polygon edge, to identify pixel pairs which define a vertical or horizontal span, and to calculate the pixel values for each pixel within a horizontal or vertical span. Interpolator/span unit 210 broadcasts the pixel pairs information to a corresponding set of pixel engines, $PE_a$–$PE_d$ 212a–212d, and at the appropriate time also broadcasts the pixel values. Pixel engines $PE_a$–$PE_d$ 212a–212d update the pixel values for an associated partition of the frame buffer 214a–214d, from which the data processing system display is refreshed. Frame buffer 214a–214d in the exemplary embodiment are configured for interleaved 4×1 partitioning of the display.

In the present invention, unlike the prior art, one or more registers 216 may be connected to interpolator/span unit 210 for saving the state of interpolator/span unit 210. Back end 200 renders primitives in which scan lines cross frame buffer page boundaries by constraining its rendering to one frame buffer page at a time, as described below.

Figure 3A:
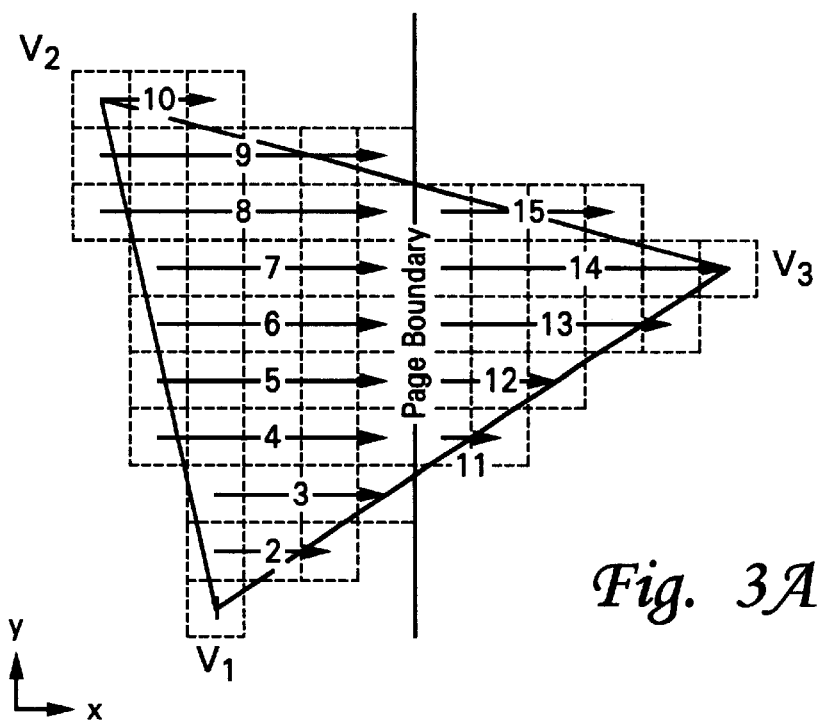
FIG. 3A–3B depict diagrams of optimized rendering of primitives utilizing page alignment techniques in accordance with a preferred embodiment of the present invention.
Figure 3B:
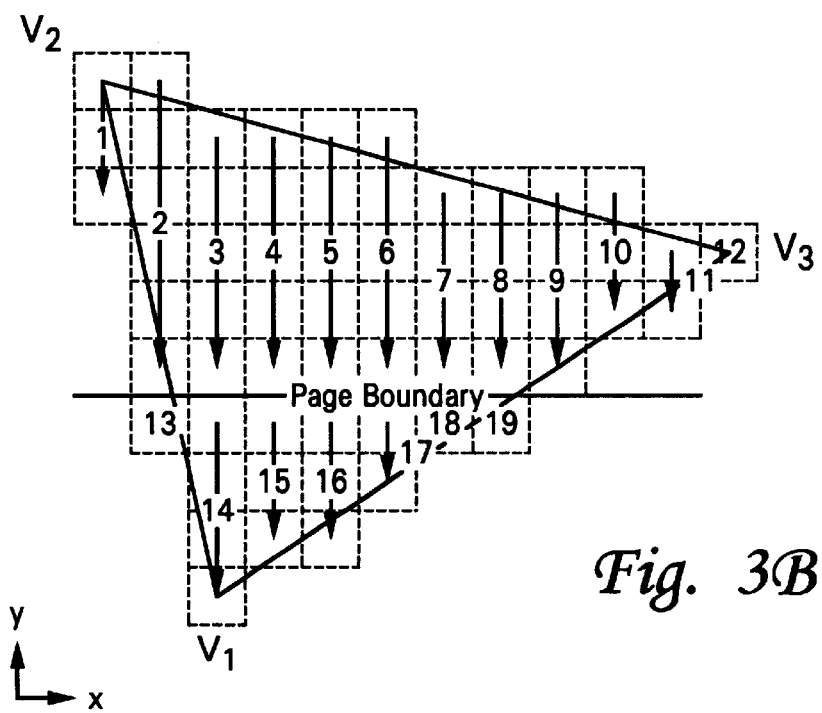

With reference now to FIGS. 3A and 3B, diagrams of optimized rendering of primitives utilizing page alignment techniques in accordance with a preferred embodiment of the present invention are depicted. In the present invention, rendering of scan lines is constrained to one frame buffer page at a time. Where a primitive bridges pixel regions mapping to different frame buffer pages, all pixels mapping to one frame buffer page are rendered before any pixels mapping to the other frame buffer page are rendered. In effect, each side of the page boundary is rendered separately, one in sequence with the other.

FIG. 3A depicts the page alignment optimized rendering technique of the present invention for scanning a primitive with horizontal scan lines. Scan lines which do not cross the page boundary, such as spans 1, 2, 3, 9, and 10 in the example depicted, are rendered in their entirety. Scan lines which cross the page boundary are broken into separate spans, such as spans 4/11, 5/12, 6/13, 7/14, and 8/15. These spans are rendered separately, so that spans 1–10 are rendered sequentially in order, a new frame buffer memory page is loaded into the cache, and then spans 11–15 are rendered sequentially in order. In this manner the primitive may be rendered with only one page crossing, substantially reducing the page crossing performance penalty associated with the page boundary.

FIG. 3B illustrates the page alignment optimized rendering technique of the present invention for scanning the same primitive with vertical scan lines. Scan lines 1, 9, 10, 11, 12—each of which only include pixels mapping to frame buffer locations on only one side of the page boundary—are rendered as single spans. The remaining scan lines, all of which contain pixels mapping to frame buffer locations in more than one frame buffer page, are split into span pairs 2/13, 3/14, 4/15, 5/16, 6/17, 7/18 and 8/19. Again, the primitive may be rendered with only a single page-out, page-in of frame buffer memory. In general, the number of page operations required with the page alignment rendering technique of the present invention should be no greater than twice the number of page boundaries intersecting the primitive being rendered.

Various techniques may be utilized to achieve page-aligned rendering in accordance with the invention. The memory architecture is known ahead of time, and the mapping of pixels to corresponding frame buffer memory locations is easily generated. Polygon processor 204 shown in FIG. 2 may therefore use this information to determine if primitive vertices are located on opposite sides of a page boundary. If so, the polygon processor may divide the primitive along the page boundary, effectively creating two primitives which may be rendered separately. Although triangles have been employed to describe the invention, most graphics adapters are also capable of rendering trapezoids. Thus, dividing either a triangle or a single trapezoid into two trapezoids does not affect the capability of a given graphics adapter to render the total primitive area.

Interpolator/span unit 210 shown in FIG. 2 may similarly be configured to render all pixels on one side of a page boundary before rendering any pixels on the other side in accordance with the invention. Interpolator/span unit 210 may calculate whether the x,y coordinates of the next pixel to be rendered lie within the currently active frame buffer page. As long at the pixels map to a single page, interpolator/span unit 210 may render the scan line in accordance with current practice.

Upon encountering a pixel to be rendered which maps to a frame buffer page different than that which is currently active, however, interpolator/span unit 210 may latch the position and/or save the state of interpolator/span unit 210 in register 216 depicted in FIG. 2. The pixel adjacent to the page boundary may then be employed as the span endpoint for that scan line, and similarly situated pixels employed as the span endpoint for all subsequent scan lines which cross the page boundary. Rendering thus proceeds within a page until all pixels mapping to that page have been rendered and no more pixels are to be rendered from that particular page. The next page needed for rendering may then be loaded and rendering may proceed from the latched position, which serves as the initial vector for the next step of rendering. The rendering process is then completed until all pixels within the primitive are rendered.

Figure 4:
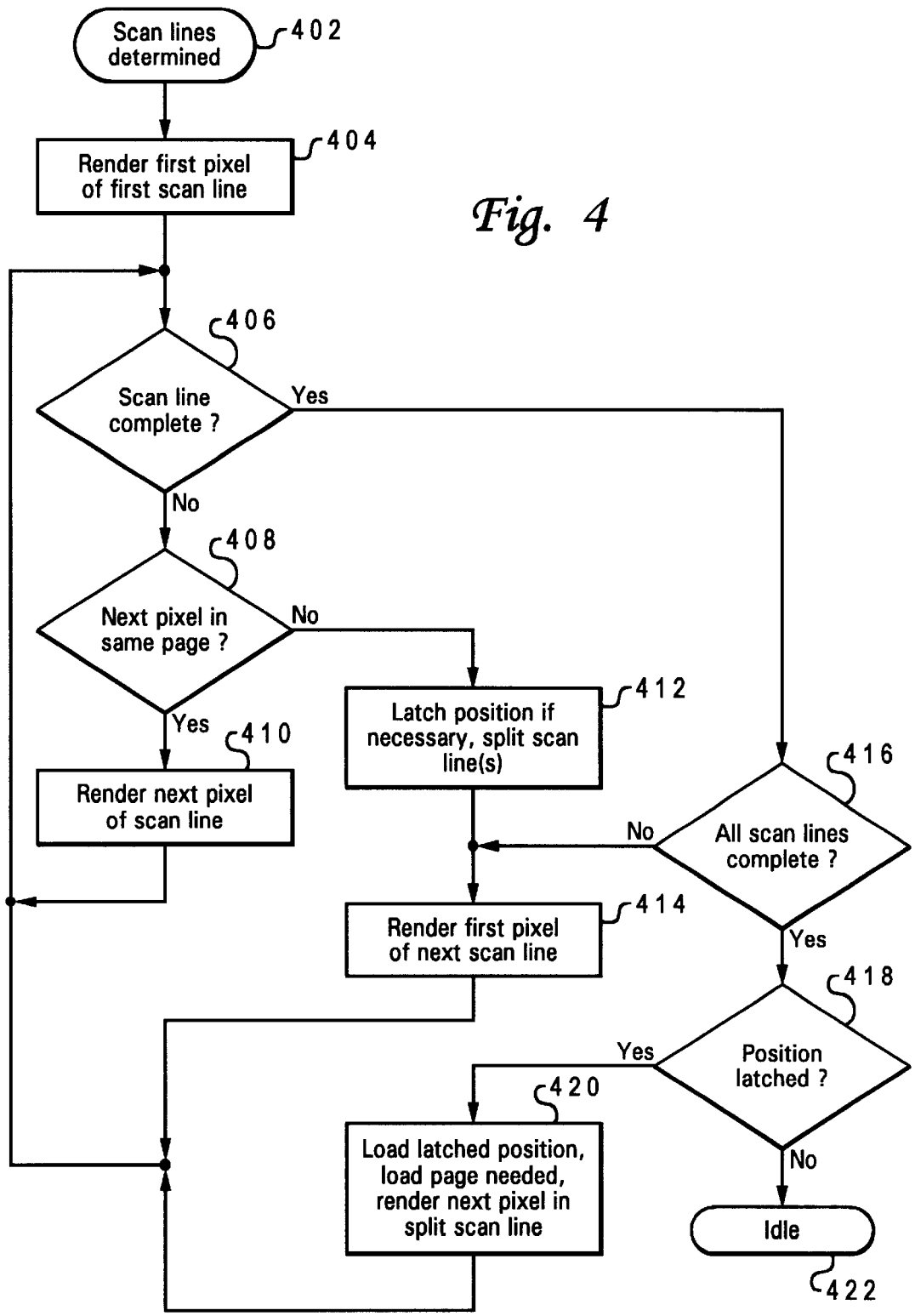
FIG. 4 is a high level flowchart for a process of page-aligned rendering in accordance with a preferred embodiment of the present invention.

Referring now to FIG. 4, a high level flowchart for a process of page-aligned rendering in accordance with a preferred embodiment of the present invention is illustrated. The process begins at step 402, which illustrates scan lines for a primitive to be rendered being determined in accordance with the known art. The process next passes to step 404, which depicts rendering the first pixel of the first scan line, and then to step 406, which illustrates a determination of whether the present scan line is complete.

If the present scan line is not complete, the process proceeds to step 408, which depicts a determination of whether the next pixel within the scan line maps to the same frame buffer memory page as the pixel just rendered. If so, the process proceeds to step 410, which illustrates rendering the next pixel of the current scan line, and then returns to step 406. If the next pixel maps to a different page, however, the process proceeds instead to step 412, which depicts latching the pixel position if necessary and split the scan line. The pixel position should be latched, and any other relevant state information saved, if the current scan line is the first scan line encountered within the primitive which bridges the page boundary encountered during rendering. Latching the pixel position effectively split that scan line and subsequent scan lines crossing the page boundary since the rendering proceeds instead with the next scan line, returning to complete the current scan line later. The process thus passes to step 414, which illustrates rendering the first pixel of the next scan line, and then returns to step 406.

Referring back to step 406, if the current scan line is determined to be complete, the process proceeds instead to step 416, which depicts a determination of whether all scan lines within the primitive have been rendered. If not, the process proceeds to step 414 and renders the first pixel of the next scan line, then returns to step 406. If all scan lines within the primitive have been completed, however, the process proceeds instead to step 418, which illustrates a determination of whether any pixel position was latched during rendering of a scan line. If so, the process proceeds to step 420, which depicts loading the latched pixel position into the rendering algorithm, loading the necessary frame buffer memory page, and rendering the next pixel in the previously-split scan line. If no pixel position was latched during rendering of the primitive scan lines, however, the process proceeds instead to step 422, which illustrates the process becoming idle until another primitive is to be rendered.

The present invention substantially reduces the performance penalty associated with switching frame buffer memory pages by constraining rendering of a primitive to one page at a time. This technique may be beneficially employed for either contiguous or interleaved frame buffer partitioning, and may be utilized regardless of whether a single pixel is rendered at a time or n×m blocks of pixels are rendered concurrently.

The savings associated with reduced page boundary crossings in the present invention far outweigh the increased complexity of the underlying rendering algorithm, which does not require significant modification or overhead to render in page-aligned fashion as disclosed. The fill rate for rendering primitives, which is a direct function of frame buffer and cache utilization, may thus be significantly improved.

It is important to note that while the present invention has been described in the context of a fully functional device, those skilled in the art will appreciate that the mechanism of the present invention and/or aspects thereof are capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of rendering a primitive, comprising:

consecutively rendering pixel groups within a scan region traversing the primitive;

prior to rendering each pixel group within the scan region, determining whether pixel data for the pixel group maps to a currently active frame buffer page; and responsive to determining that the pixel data for the pixel group does not map to the currently active frame buffer page, rendering one or more pixel groups in other scan regions within the primitive prior to rendering the pixel group.

2. The method of claim 1, wherein the step of consecutively rendering pixel groups within a scan region traversing the primitive further comprises:

rendering a single pixel at a time.

3. The method of claim 1, wherein the step of consecutively rendering pixel groups within a scan region traversing the primitive further comprises:

rendering n×m pixels at a time.

4. The method of claim 1, wherein the step of rendering one or more pixel groups in other scan regions within the primitive prior to rendering the pixel group further comprises:

rendering all pixel groups in any scan region within the primitive which correspond to pixel data within the currently active frame buffer page.

5. The method of claim 4, wherein the step of rendering all pixel groups in any scan region within the primitive which correspond to pixel data within the currently active frame buffer page further comprises:

rendering all pixel groups in any scan region within the primitive which correspond to pixel data within the currently active frame buffer page prior to rendering any pixel group which corresponds to a frame buffer page other than the currently active frame buffer page.

6. The method of claim 5, further comprising:

after rendering all pixel groups in any scan region within the primitive which correspond to pixel data within the currently active frame buffer page, loading a new frame buffer page; and rendering all pixel groups in any scan region within the primitive which correspond to pixel data within the new frame buffer page.

7. A method of efficiently rendering a primitive using page alignment techniques, comprising:

consecutively rendering pixel groups within a scan region traversing the primitive;

upon detecting a pixel group which does not correspond to pixel data within a currently active frame buffer page, latching a position of the pixel group;

rendering pixel groups within any other scan regions within the primitive which correspond to pixel data within the currently active frame buffer page;

loading the position of the pixel group;

loading a new frame buffer page containing pixel data for the pixel group; and rendering the pixel group utilizing pixel data within the new frame buffer page.

8. The method of claim 7, further comprising:

rendering each pixel group within any scan region within the primitive which corresponds to pixel data within the new frame buffer page.

9. The method of claim 7, wherein the step of rendering pixel groups within any other scan regions within the primitive which correspond to pixel data within the currently active frame buffer page further comprises:

rendering all pixel groups within any other scan regions within the primitive which correspond to pixel data within the currently active frame buffer page prior to rendering any pixel groups within any scan region within the primitive which do not correspond to pixel data within the currently active frame buffer page.

10. A data processing system for efficiently rendering a primitive, comprising:

a frame buffer containing pixel data for pixel groups within a primitive; and a graphics system consecutively rendering pixel groups within a scan region traversing the primitive, the graphics system:

prior to rendering each pixel group within the scan region, determining whether pixel data for the pixel group maps to a currently active frame buffer page; and responsive to determining that the pixel data for the pixel group does not map to the currently active frame buffer page, rendering one or more pixel groups in other scan regions within the primitive prior to rendering the pixel group.

11. The data processing system of claim 10, wherein the graphics system renders all pixel groups in any scan region within the primitive which correspond to pixel data within the currently active frame buffer page prior to rendering any pixel group within a scan region within the primitive which does not correspond to pixel data within the currently active frame buffer page.

12. The data processing system of claim 11, wherein the graphics system, after rendering all pixel groups in any scan region within the primitive which correspond to pixel data within the currently active frame buffer page, loads a new frame buffer page and renders all pixel groups in any scan region within the primitive which correspond to pixel data within the new frame buffer page.

13. A graphics adapter efficiently rendering a primitive using page alignment techniques, comprising:

means for consecutively rendering pixel groups within a scan region traversing the primitive;

means, upon detecting a pixel group which does not correspond to pixel data within a currently active frame buffer page, for latching a position of the pixel group;

means for rendering pixel groups within any other scan regions within the primitive which correspond to pixel data within the currently active frame buffer page;

means for loading the position of the pixel group;

means for loading a new frame buffer page containing pixel data for the pixel group; and means for rendering the pixel group utilizing pixel data within the new frame buffer page.

14. The graphics adapter of claim 13, wherein the graphics adapter further comprises:

means for rendering each pixel group within any scan region within the primitive which corresponds to pixel data within the new frame buffer page.

15. The graphics adapter method of claim 13, wherein the means for rendering pixel groups within any other scan regions within the primitive which correspond to pixel data within the currently active frame buffer page further comprise:

means for rendering all pixel groups within any other scan regions within the primitive which correspond to pixel data within the currently active frame buffer page prior to rendering any pixel groups within any scan region within the primitive which do not correspond to pixel data within the currently active frame buffer page.

16. A computer program product within a computer usable medium, comprising:

instructions for consecutively rendering pixel groups within a scan region traversing the primitive;

instructions for prior to rendering each pixel group within the scan region, determining whether pixel data for the pixel group maps to a currently active frame buffer page; and instructions, responsive to determining that the pixel data for the pixel group does not map to the currently active frame buffer page, for rendering one or more pixel groups in other scan regions within the primitive prior to rendering the pixel group.

17. The computer program product of claim 16, wherein the instructions for rendering one or more pixel groups in other scan regions within the primitive prior to rendering the pixel group further comprise:

instructions for rendering all pixel groups in any scan region within the primitive which correspond to pixel data within the currently active frame buffer page.

18. The computer program product of claim 17, wherein the instructions for rendering all pixel groups in any scan region within the primitive which correspond to pixel data within the currently active frame buffer page further comprise:

instructions for rendering all pixel groups in any scan region within the primitive which correspond to pixel data within the currently active frame buffer page prior to rendering any pixel group which corresponds to a frame buffer page other than the currently active frame buffer page.

19. The computer program product of claim 16, further comprising:

instructions for loading a new frame buffer page after rendering all pixel groups in any scan region within the primitive which correspond to pixel data within the currently active frame buffer page; and instructions for rendering all pixel groups in any scan region within the primitive which correspond to pixel data within the new frame buffer page.

20. A computer program product within a computer usable medium, comprising:

instructions for consecutively rendering pixel groups within a scan region traversing the primitive;

instructions, upon detecting a pixel group which does not correspond to pixel data within a currently active frame buffer page, for latching a position of the pixel group;

instructions for rendering pixel groups within any other scan regions within the primitive which correspond to pixel data within the currently active frame buffer page;

instructions for loading the position of the pixel group;

instructions for loading a new frame buffer page containing pixel data for the pixel group; and instructions for rendering the pixel group utilizing pixel data within the new frame buffer page.

21. The computer program product of claim 20, further comprising:

instructions for rendering each pixel group within any scan region within the primitive which corresponds to pixel data within the new frame buffer page.

22. The computer program product of claim 20, wherein the instructions for rendering pixel groups within any other scan regions within the primitive which correspond to pixel data within the currently active frame buffer page further comprise:

instructions for rendering all pixel groups within any other scan regions within the primitive which correspond to pixel data within the currently active frame buffer page prior to rendering any pixel groups within any scan region within the primitive which do not correspond to pixel data within the currently active frame buffer page.

\* \* \* \* \*